United States Patent Office 3,275,290
Patented Sept. 27, 1966

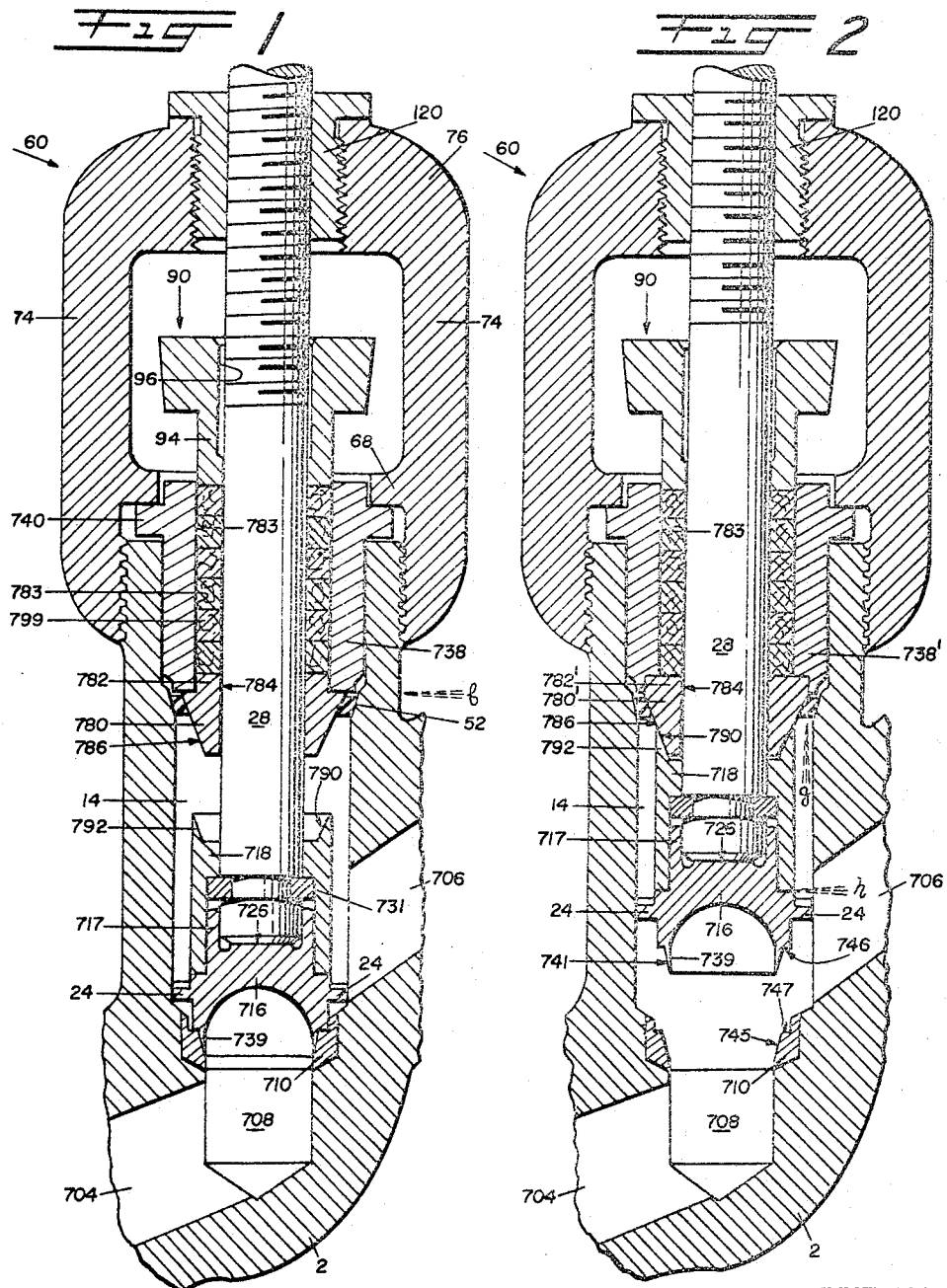

3,275,290
BACK SEAT CONSTRUCTION FOR VALVE
Chester A. Siver, 10 Fair Hill Lane, Suffield, Conn.
Original application Dec. 2, 1962, Ser. No. 244,092, now Patent No. 3,219,311, dated Nov. 23, 1965. Divided and this application Jan. 19, 1965, Ser. No. 426,493
9 Claims. (Cl. 251—330)

This application is a division of applicant's copending application Serial No. 244,092, filed December 12, 1962 and entitled Valve Construction, now United States Patent Number 3,219,311, granted November 23, 1965.

The present invention relates to valves, and more specifically to an improved back seat assembly in valves for high-pressure and/or high-temperature fluids.

High-pressure globe valves heretofore most widely employed generally have required costly and time-consuming procedures for their assembly and disassembly. The bulk of such valves have a multiplicity of elements which are fastened together, and many require a weldment to ensure safe assembly during operation which must be broken for disassembly. Moreover, the repacking of such valves while in service has been a tedious and/or somewhat hazardous practice due to the fact that the back seat construction has not always been satisfactory in operation. Additionally, the manufacture of the assembly and/or replacement of elements generally has been costly and relatively difficult because of the number of parts involved and the means of interengagement.

It is an object of the present invention to provide a valve for high-pressure and/or high-temperature fluids which has relatively few components which interrelate and cooperate in a noval manner to minimize problems in assembly and disassembly and to provide a long-lived construction.

A specific object of the present invention is to provide a noval and highly effective back seat assembly which will withstand high pressures and temperatures.

Another specific object is to provide such a novel and highly effective back seat assembly which will permit facile and speedy repacking of a bonnet.

Other objects and advantages will be apparent from the following detailed description and claims and the attached drawing wherein:

FIGURE 1 is a fragmentary sectional view in elevation of the valve embodying the present invention with the valve stem in closed position; and FIGURE 2 is a fragmentary sectional view in elevation of a valve assembly generally similar to that of FIGURE 1 with the valve stem in open position.

It has now been found that the foregoing and related objects may be readily atained in a valve assembly including a valve body having a valve chamber communicating with a through flow passage, a bonnet covering the outer end of the valve chamber and a valve stem reciprocable in the valve chamber relative to the bonnet and to a valve seat in said valve chamber. A valve disc member carried by the valve stem is cooperatively configured and dimensioned with respect to the valve seat so as to be adapted to close the through flow passage when moved into engagement therewith. The bonnet has an annular back seat portion concentrically disposed about the valve stem which projects inwardly of the valve chamber toward the through flow passage, and the back seat portion has a circumferential, generally conical seating surface portion tapering to a reduced diameter at the inner end thereof. Mounted on the valve stem for reciprocal movement therewith is a back seat member having an aperture through which the valve stem extends and an annular back seat sealing lip portion concentrically disposed about the valve stem and extending toward the bonnet. The inner periphery of the back seat sealing lip portion has a generally conical seating surface portion opening towards the bonnet and configured and dimensioned to cooperate with the generally conical seating surface portion of the back seat portion of the bonnet and provide a fluid-tight seal in cooperation therewith. The back seat sealing lip portion seating surface has an angle of taper relative to the axis of reciprocation of the valve stem normally less than the corresponding angle of taper of the back seat portion seating surface, and the sealing lip portion is transversely deflectable by movement against the back seat portion of the bonnet into stressed, substantially fluid-tight sealing engagement with the back seat portion seating surface portion. The sealing lip portion is transversely deflectable against the back seat portion during operation of the valve assembly by fluid pressure operating against the outer periphery thereof to enhance the sealing engagement of the back seat portion and the sealing lip portion.

In the preferred embodiment, the back seat member also provides the means for securing the valve disc member to the valve stem so as to minimize the total number of parts required in constructing the valve assembly. Regardless of the type of construction employed, the construction of the valve stem, disc and back seat member should be such as to preclude substantially the leakage of fluid inwardly of the back seat sealing lip, most desirably by use of an electron beam weldment extending about the outer periphery of adjoining members.

In order to obtain optimum efficacy and a long-lived structure, the bonnet is preferably constructed of a plurality of parts including a metallic bonnet portion providing a receptacle for receiving the packing about the valve stem and a back seat portion which is separately and integrally formed of a hard, wear-resistant metallic alloy. The back seat portion is annular and has a circumferential, generally conical seating surface at its inner end inclined outwardly towards the outer end of the valve body and which is dimensioned and configured to cooperate with the annular back seat sealing lip on the back seat member. In this manner, the annular back seat portion also provides a wear-resistant stem guide surface for the valve stem which extends therethrough. The back seat portion is most desirably secured to the bonnet portion securely without distortion, advantageously by use of an electron beam weldment extending about the periphery thereof.

Referring now in detail to the attached drawing, therein are illustrated valves having a bonnet assembly construction providing a separately formed back seat portion cooperating with the back seat member to provide a highly effective seal as well as a wear-resistant stem guide. The valve body 2 has end ports 704, 706 connected by the through flow passage 708 in which is seated the valve seat ring 710. The inner end of the valve stem 28 seats within the stem-receiving axial recess defined by stem guide portion 717 and stem thrust surface 726 in the outer end of the valve disc 716. At its inner end, the valve disc 716 is provided with an annular sealing lip 739 having a generally conical sealing surface 741 extending circumferentially about the outer periphery thereof which makes surface contact with the generally conical sealing surface 745 of the valve seat ring 710 to seal the through flow passage 708. The angle of taper of the disc sealing surface 741 relative to the axis of reciprocation of the valve stem 28 is normally slightly less than that of the ring sealing surface 745 to produce radial or transverse deflection upon movement thereagainst and thereby provide stressed, fluid-tight sealing engagement therebetween. This sealing engagement is enhanced by pressure of fluid acting against the inner peripheral surface of the lip 39. To limit the inward movement of the valve disc 716 and thereby avoid excessive deflection, the disc has a radial shoulder 746 which abuts against the radial shoulder 747 on the ring 710. The disc 716 also has a radial disc guide flange 24 extending about its circumference to minimize wobbling during movement between open and closed positions.

The valve disc 716 is secured to the inner end of valve stem 28 by the split ring 731 and the disc-retaining and back seat member 718 which has at its outer end an annular back seat sealing lip portion 792 providing a generally conical seating surface portion 790 on the inner periphery thereof which tapers to a reduced diameter at its inner end. Preferably, the valve disc 716 is formed of a hard, wear-resistant metallic alloy and is secured to the disc-retaining member 718 by an electron beam weldment or some other means ensuring a fluid-tight seal therebetween.

The valve chamber 14 is covered by a bonnet assembly having a generally conical bonnet packing cartridge portion 738 with a radially outwardly extending flange and a generally circular back seat portion 780 at its inner end having an outwardly projecting cylindrical portion 782 snugly received in the bore 783 of the bonnet packing cartridge portion 738. Preferably, the back seat portion 780 is fabricated from a hard, wear-resistant metallic alloy and is welded to the bonnet packing cartridge portion 738 by an electron beam or other beam of high energy particles as indicated by the rays $f$ to provide an accurately dimensioned, undistorted, strong, fluid-tight assembly. Thus, the axial aperture 784 through the back seat portion 780 provides a hard, wear-resistant stem guide surface for the valve stem 28.

The back seat portion 780 is configured to provide a generally conical seating surface portion 786 extending circumferentially about its outer periphery which tapers to a reduced diameter at the inner end thereof. The seating surface portion 786 adjacent its outer end cooperates with a generally conical surface on the adjacent portion of the inner wall of the valve body 2 defining the valve chamber 14 to provide an annular, wedge-shaped gap therebetween within which an annular float ring seal 52 of suitable elastically deformable material is seated and forced into tight sealing engagement by fluid pressure in the valve chamber. Fluid pressure in the valve chamber 14 tends to force the float ring seal 52 even more tightly into the annular gap to enhance the sealing action.

When the valve stem 28 is reciprocated outwardly to open the through flow passage 708 as seen in FIGURE 2, the conical seating surface 790 of the sealing lip 792 of the disc-retaining member 718 abuts against the conical surface 786 of the back seat portion 780 and cooperates therewith to provide a back seat seal about the valve stem 28. The back seat member seating surface 790 has an angle of taper or included angle relative to the axis of valve stem reciprocation normally slightly less than the corresponding angle of taper or included angle of the seating surface 786 of the back seat portion 780 and is transversely or radially deflectable within the elastic limit of the material by movement against the back seat seating surface 786 to provide stressed, fluid-tight sealing engagement therewith. The pressure of fluid against the outer peripheral surface of the sealing lip 792 provides transverse or radial deflecting pressure upon the sealing lip 792 against the back seat portion 780 to enhance the sealing engagement of the seating surface 790 with the seating surface 786.

In FIGURE 2, the bonnet assembly has been modified from that of FIGURE 1 by seating the cylindrical portion 782' at the outer end of back seat portion 780' in a counterbore formed in the inner end of the bonnet packing cartridge portion 738'. In this embodiment, the separate portions are welded by the electron beam indicated by the rays $g$.

The illustrated valve assembly also employs a preferred bonnet and yoke construction wherein there is provided a circumferentially extending flange 40 on the bonnet packing cartridge portion 738. The bonnet assembly is locked to the valve body 2 by the clamp yoke 60 having a lower split ring portion 62 which threadably engages upon the outer end of the valve body 2 and an upper ring portion 76 joined by a pair of vertical yoke arms 74. The inwardly porjecting bonnet retaining flange 68 engages the bonnet flange 740 to clamp the bonnet assembly on the valve body. Thus, the bonnet assembly may be rapidly and easily removed from the valve body 2 by removal of the clamp yoke 60.

The valve stem 28 is threadably supported within the generally annular yoke bushing 120. Rotation of a hand wheel (not shown) causes the valve stem 28 to reciprocate axially relative to the bushing 120 and thereby the valve body 2 and the through flow passage in opening and closing the valve.

The axially extending cylindrical bore 783 of the bonnet packing portion 738 receives packing material such as the packing rings 799 which provide an annular seal about the valve stem 28 as it extends therethrough.

Slidably mounted on the valve stem 28 upwardly of the bonnet packing portion 738 is a gland 90 having a cylindrical bushing portion 94 of reduced diameter at its lower end dimensioned to fit snugly within the bore 783. The axial aerture 96 in the gland 90 through which the valve stem 28 projects should be dimensioned slightly larger to minimize any binding forces upon the stem 28 and desirably has its outer portion of enlarged diameter. Adjacent its outer end, the gland 90 has a radially outwardly extending flange 92 with diametrically opposed extension portions or ears (not shown) which extend radially outwardly above inwardly projecting, diametrically opposed pairs of bosses (not shown) on the lower split ring portion 62. A pair of gland bolts (no shown) are pivotally mounted at their lower ends on pins which in turn are journalled between the pairs of bosses (not shown) on the split ring portion 62. These bolts extend freely upwardly through apertures in the extension portions on ears (not shown) of the flange 92 and nuts (not shown) are tightened on the bolts to urge the gland bushing portion 94 into the bore 783 and thus to compress the material of the packing rings 799 about the valve stem 28 in the bore 783.

In the preferred embodiment, the valve disc 716 is fabricated as an integral element from a hard, wear-resistant metallic alloy such as Stellite, a product of Haynes-Stellite Division of Union Carbide Corporation as is the valve seat ring 710, thereby providing hard, wear-resistant sealing surfaces. To render the back seat seal effective, the metallic disc-retaining and back seat member 718 is secured to the hard, wear-resistant metallic alloy valve disc 716 by a distortion-free weldment providing a fluid and pressure-tight seal therebetween and about the entire periphery. Such a weldment is readily provided by a beam of electrons or other high energy particles as indicated by the beam $h$.

In operation, the back seat seal is enhanced by fluid pressure with the valve chamber 14 and is so effective that the packing rings 799 may be inserted and replaced while the valve is in service. This procedure is further enabled by the facile and independent adjustment and movement of the gland 90 as hereinbefore described.

Thus, it can be seen that the present invention provides a novel and highly effective back seat assembly for globe type valves which will withstand high pressures and temperatures and which will permit facile and speedy repacking of the bonnet. The assembly further may provide hard, wear-resistant surfaces with a minimum of parts so as to minimize problems in assembly and disassembly and to provide a long-lived construction.

Having thus described the invention, I claim:

1. In a valve including a valve body having a valve chamber communicating with a through flow passage and an annular valve seat on the wall of said valve body in said flow passage; a bonnet covering the outer end of said valve chamber; and a valve stem reciprocable in said valve chamber relative to said bonnet and valve seat, the combination therewith of a valve sealing assembly for said valve including an annular back seat portion on said bonnet concentrically disposed about said valve stem and projecting toward said through flow passage and a metallic valve sealing member mounted on said valve stem for reciprocation therewith, said back seat portion being metallic and having a generally conical seating surface portion extending circumferentially about the outer surface thereof and tapering to a reduced diameter at the inner end thereof, said valve sealing member having a first seating surface portion at the end thereof adjacent said through flow passage dimensioned and configured to cooperate with said valve seat and provide a fluid-tight seal in cooperation therewith and an annular back seat sealing lip portion concentrically disposed about said valve stem and extending toward said bonnet, the inner periphery of said back seat sealing lip portion having a generally conical seating surface portion opening toward said bonnet and configured and dimensioned to cooperate with the generally conical seating surface portion of said back seat portion and provide a fluid-tight seal in cooperation therewith, said back seat sealing lip portion seating surface having an angle of taper relative to the axis of reciprocation of said valve stem normally slightly less than the corresponding angle of taper of said back seat portion seating surface portion and selected to provide limited deformation of said sealing lip portion to conform to the taper of said back seat portion seating surface portion within the elastic limits of the metal thereof, said sealing lip portion being transversely deflected by movement against said back seat portion into stressed substantially fluid-tight sealing engagement with said back seat portion seating surface portion, said valve chamber providing free access to the outer periphery of said sealing lip portion in the back seated position of said valve sealing member to enable passage of fluid freely thereabout, said sealing lip portion being transversely deflectable against said back seat portion during operation of the valve by fluid pressure acting against the outer periphery thereof to enhance the sealing engagement of said back seat portion and said sealing lip portion.

2. The valve of claim 1 wherein said back seat portion of said bonnet is of hard, wear-resistant metallic alloy.

3. The valve of claim 1 wherein said first seating surface portion and said sealing lip portion of said valve sealing member are portions of separate abutting elements, and said elements have a fluid-tight seal therebetween.

4. In a valve including a valve body having a valve chamber communicating with a through flow passage and an annular valve seat on the wall of said valve body in said flow passage communicating with a through flow passage; a bonnet covering the outer end of said valve chamber; a valve stem reciprocable in said valve chamber relative to said bonnet and valve seat; and a valve disc member on said valve stem having a seating surface portion at the end adjacent said flow passage dimensioned and configured to cooperate with said valve seat and provide a fluid-tight seal in cooperation therewith; the combination therewith of a valve sealing assembly for said valve including a metallic annular back seat portion on said bonnet concentrically disposed about said valve stem and projecting toward said through flow passage and a metallic back seat member mounted on said valve stem for reciprocation therewith, said back seat portion having a generally conical seating surface portion extending circumferentially about the outer surface thereof and tapering to a reduced diameter at the inner end thereof, said back seat member having an annular back seat sealing lip portion concentrically disposed about said valve stem and extending toward said bonnet, the inner periphery of said back seat sealing lip portion having a generally conical seating surface portion opening toward said bonnet and configured and dimensioned to cooperate with the generally conical seating surface portion of said back seat portion and provide a fluid-tight seal in cooperation therewith, said back seat sealing lip portion seating surface having an angle of taper relative to the axis of reciprocation of said valve stem normally slightly less than the corresponding angle of taper of said back seat portion seating surface portion and selected to provide limited deformation of said sealing lip portion to conform to the taper of said back seat portion seating surface portion within the elastic limits of the metal thereof, said sealing lip portion being transversely deflected by movement against said back seat portion into stressed, substantially fluid-tight sealing engagement with said back seat portion seating surface portion, said valve chamber providing free access to the outer periphery of said sealing lip portion in the back seated position of said back seat member to enable passage of fluid freely thereabout, said sealing lip portion being transversely deflectable against said back seat portion during operation of the valve by fluid pressure acting against the outer periphery thereof to enhance the sealing engagement of said back seat portion and said sealing lip portion.

5. The valve of claim 4 wherein said back seat member has means thereon for mounting said valve disc member on said valve stem.

6. The valve of claim 4 wherein said back seat member and said valve disc member abut about their periphery and have a fluid-tight seal therebetween.

7. The valve of claim 4 wherein said back seat portion of said bonnet is of hard, wear-resistant metallic alloy.

8. In a valve including a valve body having a valve chamber communicating with a through flow passage and an annular valve seat on the wall of said valve body in said flow passage; a bonnet covering the outer end of said valve chamber; a valve stem reciprocable in said valve chamber relative to said bonnet and valve seat; a valve disc member on said valve stem having a seating surface portion at the end adjacent said through flow passage dimensioned and configured to cooperate with said valve seat and provide a fluid-tight seal in cooperation therewith, the combination therewith of a valve sealing assembly for said valve including a metallic annular back seat portion on said bonnet concentrically disposed about said valve stem and projecting toward said through flow passage, a metallic annular back seat member having a central aperture through which said valve stem extends, and means interengaging said valve stem and back seat member, said back seat portion having a generally conical seating surface portion extending circumferentially about the outer surface thereof and tapering to a reduced diameter at the inner end thereof, said back seat member and said valve disc member abutting about their adjacent peripheries and being interengaged by a fluid-tight seal extending about their periphery to mount said disc member on said valve stem, said back seat member having an annular back seat sealing lip portion concentrically disposed about said valve stem and extending toward said bonnet, the inner periphery of said back seat sealing lip portion having a generally conical seating surface portion opening toward said bonnet and configured and dimensioned to cooperate with the generally conical seating surface portion of said back seat portion and provide a fluid-tight seal in cooperation therewith, said back seat sealing lip portion seating surface having an angle of taper relative to the axis of reciprocation of said valve stem normally slightly less than the corresponding angle of taper of said back seat portion seating surface portion and selected to provide limited deformation of said sealing lip portion to conform to the taper of said back seat portion seating surface portion within the elastic limits of the metal thereof, said sealing lip portion being transversely deflected by movement against said back seat portion into stressed, substantially fluid-tight sealing engagement with said back seat portion seating surface portion, said valve chamber providing free access to the outer periphery of said sealing lip portion in the back seated position of said back seat member to enable passage of fluid freely thereabout, said sealing lip portion being transversely deflectable against said back seat portion during operation of the valve by fluid pressure acting against the outer periphery thereof to enhance the sealing engagement of said back seat portion and said sealing lip portion.

9. The valve of claim 8 wherein said back seat portion of said bonnet is of hard, wear-resistant alloy.

References Cited by the Examiner

UNITED STATES PATENTS

| | | | |
|---|---|---|---|
| 258,019 | 5/1882 | Christ | 251—330 |
| 837,063 | 11/1906 | Hite et al. | 251—214 X |
| 1,271,898 | 7/1918 | Holt | 251—330 |
| 2,192,339 | 3/1940 | Wilson | 251—334 |
| 2,587,569 | 2/1952 | Giaque | 251—333 |

FOREIGN PATENTS 560,321  7/1923  France.

OTHER REFERENCES

Hancock: Catalogue of Hancock Valves, Watertown, Mass. Valve Type No. 7250 W relied on, published 1962.

Rockwell-Edward: "Univalve" Catalogue of Edward Valves, Incorporated, East Chicago, Indiana; page 12, published 1962.

M. CARY NELSON, *Primary Examiner.*

A. ROSENTHAL, *Assistant Examiner.*